United States Patent
Rocchetti et al.

(10) Patent No.: US 6,216,197 B1
(45) Date of Patent: *Apr. 10, 2001

(54) METHOD AND APPARATUS FOR EXTENDING PRINTER MEMORY USING A NETWORK FILE SYSTEM

(75) Inventors: Robert J. Rocchetti, Portola Valley; Yousef Yacoub, San Jose, both of CA (US)

(73) Assignee: Sun Microsystems, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/673,125

(22) Filed: Jul. 1, 1996

(51) Int. Cl.[7] .................................................. G06F 13/00
(52) U.S. Cl. .......................... 711/2; 711/3; 711/101; 711/147; 711/148; 358/4; 358/261; 707/206
(58) Field of Search .................................. 711/2, 4, 160, 711/3, 118, 101–105, 112, 113, 114, 147–153; 395/114, 102, 116, 112; 712/115, 116; 707/206; 358/261.4

(56) References Cited

U.S. PATENT DOCUMENTS

| 5,050,098 | * | 9/1991 | Brown, III et al. .................. 395/112 |
| 5,159,681 | * | 10/1992 | Beck et al. ............................ 395/116 |
| 5,471,564 | * | 11/1995 | Dennis et al. ........................ 395/114 |

* cited by examiner

*Primary Examiner*—Than Nguyen
(74) *Attorney, Agent, or Firm*—Blakely Sokoloff Taylor & Zafman

(57) ABSTRACT

A memory extension mechanism for a computer printer or other computer output device. The mechanism allows the computer printer to function with less than the maximum amount of real memory normally required by the computer printer in processing a print job. When the computer printer runs low on the amount of memory available, a portion of real memory of the printer containing infrequently used data is copied through a network to a computer's file system storage. The portion of the real memory containing the infrequently used data is then cleared and made available for other uses by the computer printer. When the piece of memory that was previously copied through the network is subsequently needed, it is copied through the network back into the computer printer's real memory.

8 Claims, 2 Drawing Sheets

METHOD AND APPARATUS FOR EXTENDING PRINTER MEMORY USING A NETWORK FILE SYSTEM

BACKGROUND OF THE INVENTION

(1) Field of the Invention

The present invention relates to an apparatus and a method for extending memory in a computer printer or other computer output device. More particularly, the present invention relates to an apparatus and a method for extending the memory in a computer printer or other output device using a computer network and a network file system protocol.

(2) Prior Art

In the computing industry, it has become quite common to use a computer network to extend available memory on computer systems. A computer network is the interconnection of two or more computer systems. The interconnection is accomplished through some network medium such as through radio waves, wires, fiber optic cables, etc. A network medium is used to send messages between the computer systems. The messages being sent between the computers conform to a specific form known as a protocol.

Network protocols have been used to extend the amount of memory available in a computer. For example, network protocols have been used to extend the space available for the file system storage of a computer. NFS (Network File System) protocol designed by Sun Microsystems, Inc. is one such network protocol. The method for extending available computer memory using a network is well known in the art.

As with computers, computer printers also require the use of memory. A computer printer is a device which transforms information from a computer system into markings on a physical medium such as on a sheet of paper. During the transformation of information, the printer may need additional memory. For example, processing of a complex document requires a substantial amount of memory. An example of a complex document includes, a document containing text with different font styles, different character size, drawings intermingled with text, etc. However, presently available laser printers or other continuous raster scan devices are equipped with limited memory space with no source of auxiliary memory. If a printer memory becomes full before the data to be printed is completely transferred to the printer, the printer will halt and typically produce an error message. Thus, the limitation on available memory leads to failures in printing.

Providing additional memory space is especially relevant for laser printers or other continuous raster scan devices which typically require that all bit mapped data representing a page to be printed is in memory. This is due to the fact that once a print engine of a printer begins operation, it runs at a constant speed and the print engine cannot stop or slow down to wait for additional bit mapped data to be provided.

Given that presently available printers have limited memory space, it is desirable to have a method and an apparatus for extending the amount of memory available to a printer using a network and a set of network protocols.

BRIEF SUMMARY OF THE INVENTION

The present invention provides a method and an apparatus which are advantageously used in conjunction with a digital computer and a computer network to provide the effect of additional memory for a printer or other output device. The method and apparatus of this invention allows the computer printer or other computer output device to function with less than the maximum amount of real memory normally required by the printer or other output device in processing a complex print or related job.

Assuming the output device is a printer, providing additional memory is not an issue if the printer is equipped with a large enough memory to store data for an arbitrarily complex document for printing. However, providing a large amount of memory is expensive. If cost is to be limited, performance may be sacrificed. For example, given a complex document to print, if the printer memory has a limited amount of memory and becomes full before the data to be printed is completely transferred to the printer, the printer will halt and typically produce an error message. The present invention provides a lower cost higher performance alternative to the presently available printers by obviating the need for purchasing a printer with a large memory size and still providing a source of auxiliary printer memory if a need for additional memory arises.

According to the invention, when the printer runs low on the amount of memory available, a portion of real memory of the printer containing infrequently used data is copied through a network to a computer's file system storage. The portion of the real memory containing the infrequently used data is then cleared and made available for other uses by the printer. When the piece of memory that was previously copied through the network is subsequently needed, it is copied through the network back into the printer's real memory.

As will be seen from the description which follows, the copying of memory into and out of the computer printer memory will allow the printer to function as if it had additional auxiliary memory.

DETAILED DESCRIPTION OF THE INVENTION

The present invention provides methods and apparatus which are advantageously used in conjunction with a digital computer and a computer network to provide the effect of additional computer memory to a printer or other computer output device. The method and apparatus of this invention allows the computer printer or other output device to function with less than the maximum amount of real memory that is normally required by the printer in processing complex print or related jobs.

Figure 1:
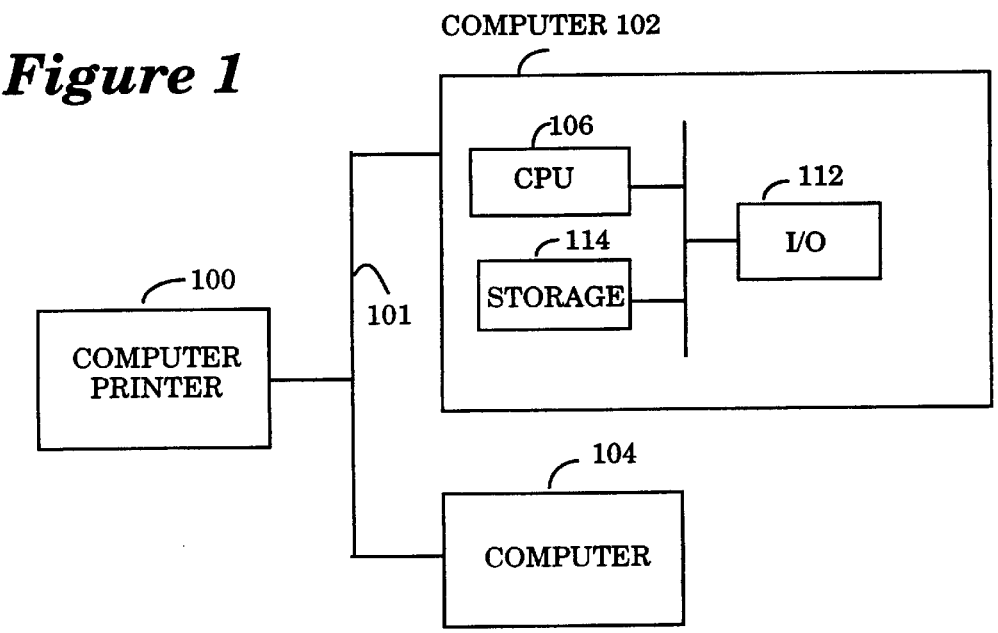
FIG. 1 illustrates in block diagram form a generalized computer system which may utilize the invention.

FIG. 1 illustrates in block diagram form a generalized computer system which may utilize the invention. Assuming the output device is a computer printer 100, the printer is coupled to computer 102 and computer 104 through network 101. Each computer has processor 106 and input/output device 112 as well as storage devices 114 such as an NFS (Network File System) storage.

According to the invention, when computer printer 100 runs low on the amount of memory available, a portion of the real memory of computer printer 100 containing infrequently used data is copied through network 101 to either computer 102's or 104's NFS storage 114. The portion of the real memory containing the infrequently used data is then cleared and made available for other uses by computer printer 100.

When the piece of memory that was previously copied through network 101 is subsequently needed, it is copied from NFS storage 114 of computer 102 or 104 and transmitted to computer printer 100 through input/output device 112 of computer 102 or 104 and through network 101 back into computer printer 100's real memory.

Figure 2:
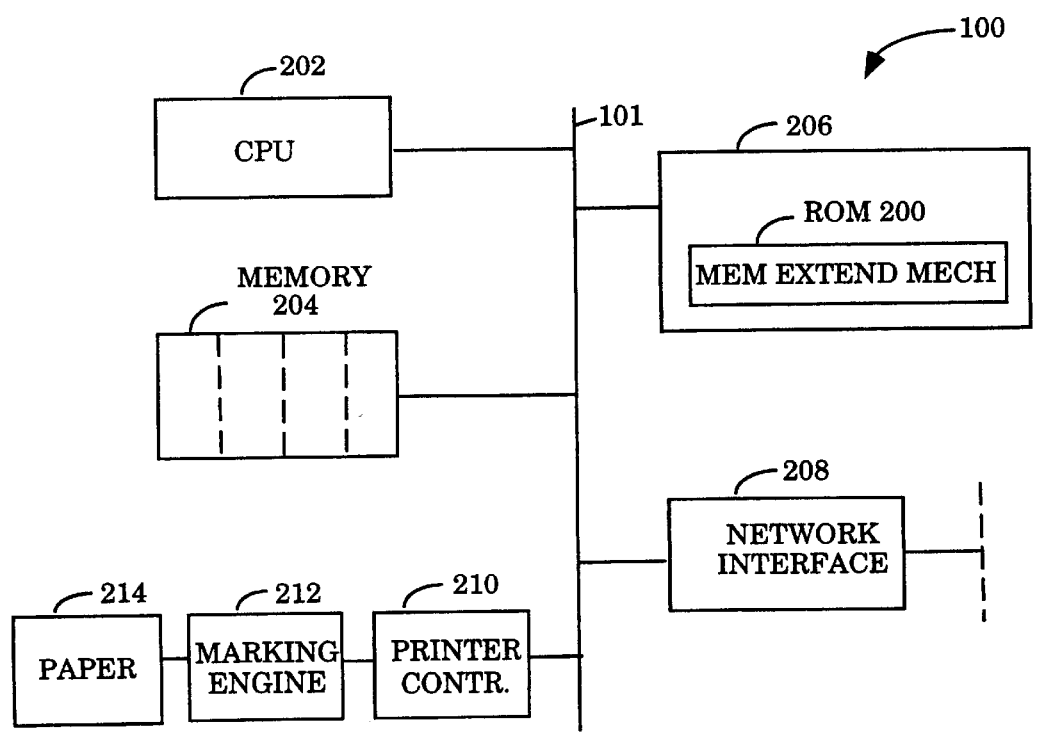
FIG. 2 is an exemplary implementation of the present invention.

FIG. 2 illustrates an exemplary embodiment of the present invention. Computer printer 100 has processor 202, RAM (Random Access Memory) 204, ROM (Read Only Memory) 206, network interface 208, printer controller 210, marking engine 212, and paper 214.

With the present invention, infrequently used portions of RAM 204 such as character outlines, templates and sections of previous pages printed is moved to memory 108 of either computer 102 or 104. The corresponding memory space in RAM 204 of computer printer 100 is freed up giving computer printer 100 additional memory space to store data representing a page to be printed. The amount of memory space freed up is dependent on the type of infrequently used portions of RAM 204 moved. For example, removing character outlines from RAM 204 can free up on the average between one to fifty kilo-bytes of memory space.

ROM 206 stores information used by the printer in its printing process such as font information used during printing data. ROM 206 also has memory extension mechanism 200 for extending the available memory space of computer printer 100 by using network 101. Memory extension mechanism 200 extends RAM 204 by determining which portion of RAM 204 will not be immediately needed by computer printer 100 and copies that portion of RAM 204 for transmission and storage in NFS storage 114 of a computer system coupled to computer printer 100. The transmission is performed through network 101. Memory extension mechanism 200 also keeps track of the information which has been transmitted to the computer system for storage and keeps track of the location where the information is stored in NFS storage 114 of the computer system.

Network interface 208 interfaces computer printer 100 with computers 102 and 104. Printer controller 210 directs the mechanical operation of the printing process through marking engine 212 for printing to be performed on paper 214.

Figure 3:
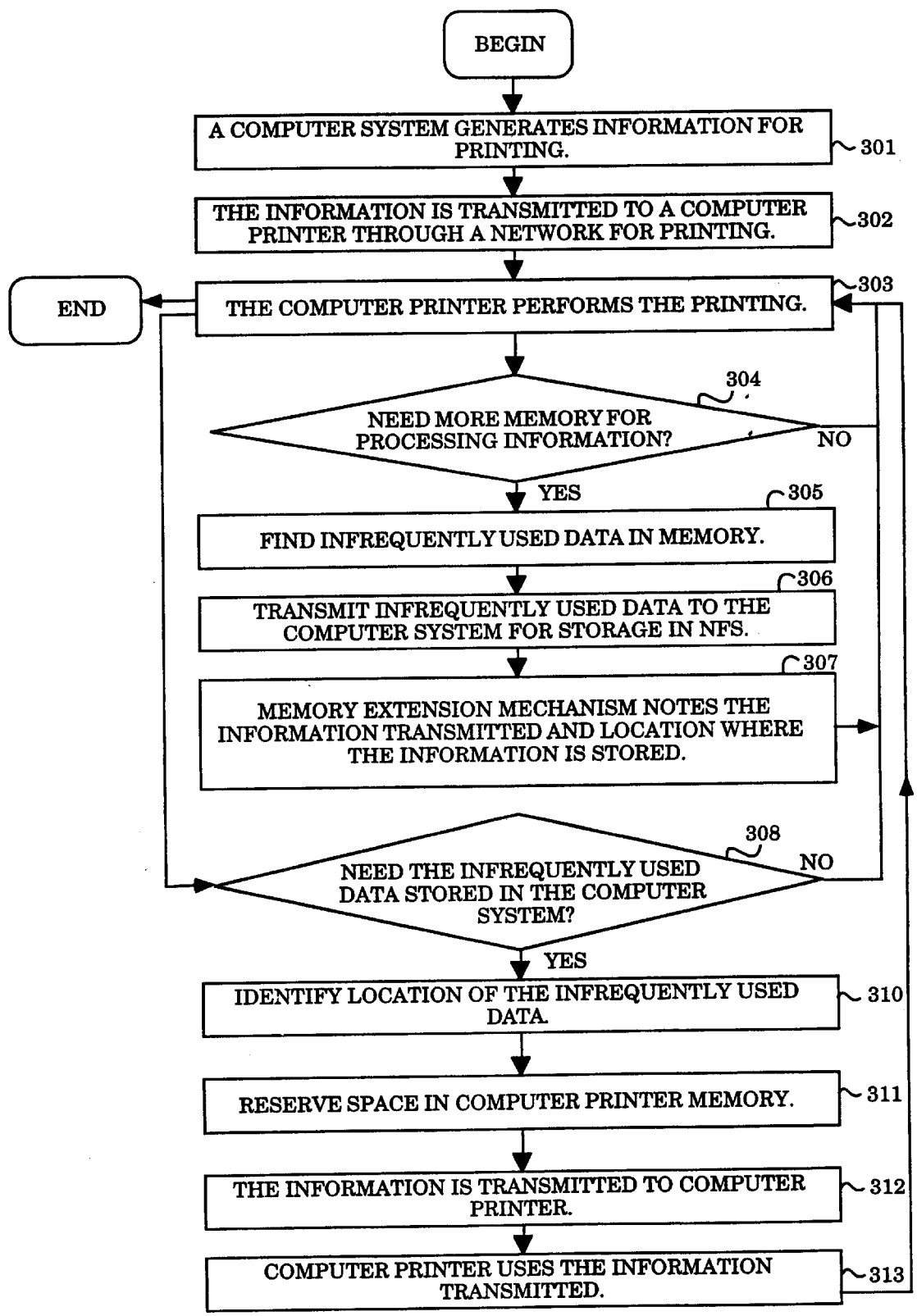
FIG. 3 is a flow diagram illustrating the general steps followed by the present invention.

FIG. 3 is a flow diagram illustrating the general steps followed by the present invention. In step 301, information is generated in a computer system. In step 302, the information is sent through network 101 to computer printer 100. In step 303, computer printer 100 transforms the information into marks on a medium such as a sheet of paper 214. In step 304, during the transformation process, if processor 202 in computer printer 100 requires memory space, then in step 305, memory extension mechanism 200 finds information in RAM 204 that is not immediately needed. The selection of such information may be determined using different heuristics, for example, least recently used information may be selected as data which are not immediately needed by computer printer 100. In step 306, computer printer 100 sends the information out through network 101 to a computer system which stores the information in its NFS storage 114.

In step 307, memory extension mechanism 200 notes what information it has sent from its RAM 204 to the computer system and where it has placed the information in the remote NFS storage 114. The transformation of information to markings continues. In step 308, if during the transformation process, computer printer 100 needs some infrequently used information it had sent through network 101, computer printer 100 reverses the process and retrieves the information. In step 309, computer printer 100 identifies where it had placed the information in network 101.

In step 310, computer printer 100 notes where it had placed the information in the computer system's NFS storage 114. In step 311, the space to hold the information is reserved in RAM 204 of computer printer 100 by processor 202. In step 312, the information is sent from the computer system through network 101 to computer printer 100. In step 313, computer printer 100 notes the retrieved information and continues the transformation process. The steps above to send or retrieve information is repeated as needed until the entire transformation is complete.

What has been described is a method and an apparatus for extending computer printer memory through a network. According to the invention, when the printer runs low on the amount of memory available, infrequently used parts of real memory are copied through the network to a computer's NFS storage. The computer is coupled to the printer through a network. The real memory is then cleared and made available for other uses by the printer. When the piece of memory that was previously copied through the network is subsequently needed, it is copied through the network back into the printer's real memory.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for allowing an output device having a memory and coupled to a plurality of computers through a network to continue transferring information to said memory of said output device when unused space in said memory is low, said method comprising:

detecting said unused space in said memory as being low when additional said information is to be transferred to said output device;

moving, through a network, infrequently used data from said memory of said output device, to a file system storage of any one of said plurality of computers in response to said detecting, such that additional memory space is available for continued transferring of said information to said memory of said output device;

saving or said output device information, addressing information of said one of said plurality of computers to which said infrenquently used data is copied.

2. The method of claim 1 wherein said step of moving further comprises the step of searching for said infrequently used data from said memory of said computer output device.

3. The method of claim 2 further comprising the steps of:

copying said infrequently used data from said memory of said computer output device and clearing memory space of the memory of said output device which contained the infrequently used data, the memory space being available for use by the information being transferred after the clearing.

4. The method of claim 3 further comprising the step of transmitting said infrequently used data to a plurality of said computer systems through said network.

5. The method of claim 1 further comprising retrieving through a network said infrequently used data from said plurality of computer systems when said infrequently used data is needed by said computer output device.

6. An output device coupled to a plurality of computers through a network, the output device comprising:

a random access memory output device configured to store information to be output and infrequently used data;

a read only memory containing, a memory extension mechanism configured to extend an amount of available memory of the output device by detecting that the unused space in said random access memory of said output device is low when additional said information is to be transferred to said output device, moving said infrequently used data through a network to a storage unit of any one of said plurality of computers in response to said detecting to provide additional memory space in said random access memory for use by additional said information being transferred to said output device, and saving on said output device information and addressing information of said one of said plurality of computers to which said infrequently used data is copied; and a processor coupled to said random access memory and said read only memory for running said memory extension mechanism.

7. The computer system defined by claim 6 wherein said memory extension mechanism includes code having a plurality of modules each configured to carry out at least one function to be executed by the computer system, the plurality of modules comprising:

first module which finds the infrequently used data;

a second module which moves the infrequently used data to said storage unit;

a third module which notes the data transmitted and location where it is stored.

8. The computer system defined by claim 7 wherein the plurality of modules further comprises:

a fourth module which locates the moved data in said storage unit;

a fifth module which reserves space in the random access memory;

a six module which transmits the located data from the storage unit to the reserved space in the random access memory.

* * * * *